(12) United States Patent  (10) Patent No.: US 6,892,470 B2
Olson et al.  (45) Date of Patent: May 17, 2005

(54) WHEELED DISTANCE MEASURING DEVICE

(75) Inventors: R. Brian Olson, Naperville, IL (US); Robert E. Hutchinson, Naperville, IL (US)

(73) Assignee: Keson Industries, Inc., Aurora, IL (US)

( * ) Notice: Subject to any disclaimer, the term of this patent is extended or adjusted under 35 U.S.C. 154(b) by 0 days.

(21) Appl. No.: 10/331,751

(22) Filed: Dec. 30, 2002

(65) Prior Publication Data

US 2004/0123480 A1 Jul. 1, 2004

(51) Int. Cl.[7] ................................................. G01B 3/12
(52) U.S. Cl. ........................................... 33/782; 33/781
(58) Field of Search ............................ 403/49, 92, 321; 33/772, 782, 781, 773, 774, 775, 776, 777, 778, 779, 780, 34, 35, 36, 37, 38, 39.1; D10/70

(56) References Cited

U.S. PATENT DOCUMENTS

| | | | | |
|---|---|---|---|---|
| 2,389,811 A | * | 11/1945 | Ozlek ........................... | 403/92 |
| 2,716,819 A | * | 9/1955 | Staples ......................... | 33/781 |
| 2,741,031 A | * | 4/1956 | Martin, Jr. et al. ............ | 33/781 |
| 3,151,397 A | * | 10/1964 | King et al. .................... | 33/782 |
| 3,187,373 A | * | 6/1965 | Fisher .......................... | 16/324 |
| 3,345,092 A | * | 10/1967 | Athman et al. ............. | 285/283 |
| 3,441,209 A | * | 4/1969 | Farman ..................... | 235/95 R |
| 3,616,541 A | * | 11/1971 | Crayton ....................... | 33/781 |
| 3,883,157 A | * | 5/1975 | Simpkins .................... | 280/287 |
| 3,922,793 A | * | 12/1975 | Gandrud ...................... | 33/781 |
| 4,308,665 A | * | 1/1982 | Losch .......................... | 33/781 |
| D437,796 S | * | 2/2001 | Risi ............................. | D10/70 |
| D486,406 S | * | 2/2004 | Critelli et al. ............... | D10/70 |

OTHER PUBLICATIONS

Copy of page from Rolatape Corporation web site www.rolatape.com Dec. 26, 2002 1999 Keson Corporation catalog.

* cited by examiner

Primary Examiner—R. Alexander Smith
(74) Attorney, Agent, or Firm—Wood, Phillips, Katz, Clark & Mortimer

(57) ABSTRACT

A distance measuring device having a wheel, a frame, and a distance counter on the frame. The wheel has a radius and an exposed surface that can be rolled against a surface on which a distance measurement is to be taken. The wheel is mounted upon the frame for rotation around a first axis. The distance counter is actuated by the wheel. The frame has an elongate operating arm projecting away from the wheel. The frame has a mounting portion to which the wheel is mounted for rotation. The elongate operating arm is pivotable relative to the mounting portion between an operating state and a store state.

24 Claims, 7 Drawing Sheets

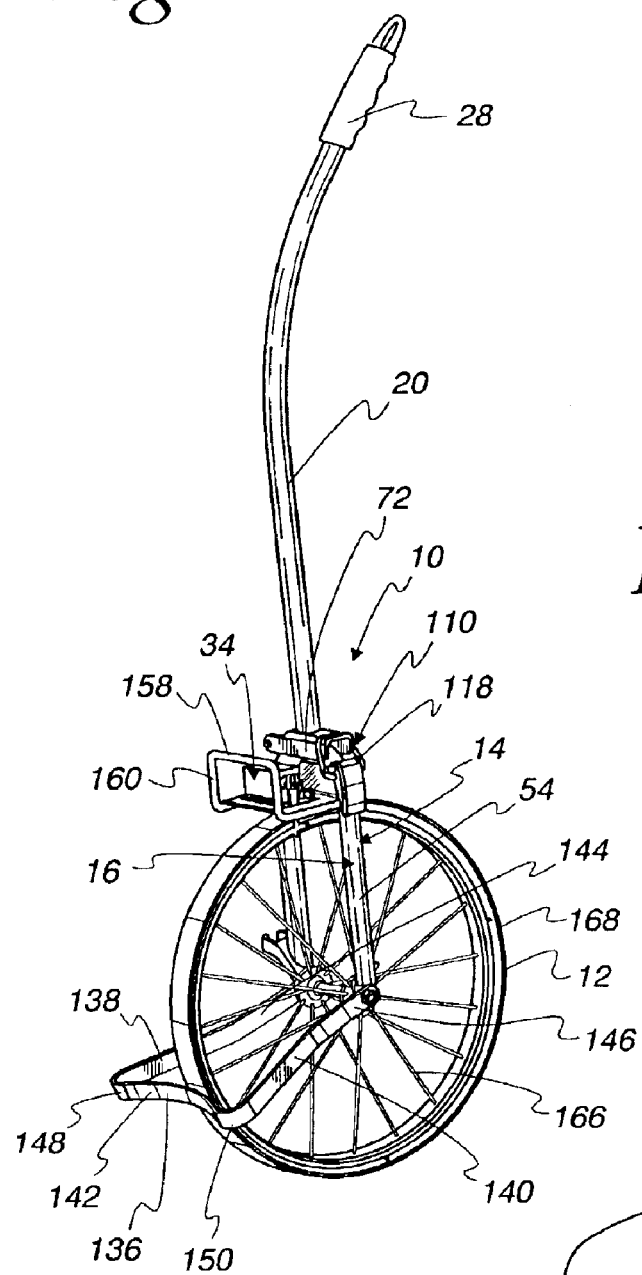

WHEELED DISTANCE MEASURING DEVICE

BACKGROUND OF THE INVENTION

1. Field of the Invention

This invention relates to wheeled distance measuring devices and, more particularly, to a wheeled distance measuring device that can be reconfigured to a stored state.

2. Background Art

Wheeled distance measuring devices are commonly used in many different industries, and particularly in the construction trade. In a conventional design for such a device, a frame, to which the wheel is mounted for rotation, supports a counter. The counter is triggered one or more times for each revolution of the wheel as it is rolled against an underlying surface upon which a measurement is to be taken. The device is manipulated by an operator through an elongate operating arm projecting away from the wheel.

Designers of these devices strive towards a number of different objectives. First of all, convenience of operation is a critical design parameter. As a result, the graspable portion of the measuring device, through which the device is repositioned by an operator, should be situated in operation so that the user can comfortably engage and move the measuring device as required to take an appropriate measurement. To permit this, the operating arms typically projects away from the wheel a substantial distance. As a consequence, to package this type of measuring device in a squared container, the container must be dimensioned to enclose the entire operating arm. In the absence of some mechanism to reconfigure the operating arm, the size of the storage/shipping container must by necessity be quite large, thereby taking up valuable storage space, complicating handling, and accounting for relatively large shipping costs.

It is known to form the elongate operating arm with telescoping parts which allow the arm to be reduced in length for packaging and storage. However, telescoping connections require a base part with a sizable length to telescopingly accept the other element(s).

Another design objective is to permit the measuring device to be stably maintained in one or more positions, such as an upright position, to facilitate temporary on-site storage, stable placement in a storage/shipping container, orientation for repair, etc.

SUMMARY OF THE INVENTION

In one form, the invention is directed to a distance measuring device having a wheel, a frame, and a distance counter on the frame. The wheel has a radius and an exposed surface that can be rolled against a surface on which a distance measurement is to be taken. The wheel is mounted upon the frame for rotation around a first axis. The distance counter is actuated by the wheel. The frame has an elongate operating arm projecting away from the wheel. The frame has a mounting portion to which the wheel is mounted for rotation. The elongate operating arm is pivotable relative to the mounting portion between an operating state and a store state.

In one form, the elongate operating arm is pivotable about a second axis between the operating and stored states, with the first and second axes being nonparallel to each other. In one form, the first and second axes are substantially orthogonal to each other.

In one form, the elongate operating arm has a hinge bracket which is pivotably connected to the frame mounting portion. The hinge bracket has a first edge which can be placed supportingly against a flat, horizontal, underlying surface with the elongate operating arm in the stored state to maintain the distance measuring device in an upright orientation wherein the first axis is horizontally oriented.

The hinge bracket may have a second edge spaced from the first edge which can be placed supportingly against a flat, horizontal, underlying surface simultaneously with the first edge to maintain the distance measuring device in the upright orientation with the elongate operating arm in the stored state.

In one form, at least one supporting edge is provided on the frame mounting portion which can be placed supportingly against the flat, horizontal, underlying surface simultaneously with the first edge with the elongate operating arm in the stored state to maintain the distance measuring device in the upright orientation.

The distance measuring device may further include a resilient holding element on the frame. The resilient holding element engages the elongate operating arm to releasably maintain the elongate operating arm in the stored state.

In one form, the resilient holding element has at least one arm that is changeable between first and second states. The at least one arm changes from the first state to the second state and back into the first state as an incident of the elongate operating arm changing from the operating state into the stored state.

In one form, there is a first connector part on the frame mounting portion and a second connector part on the elongate operating arm. The first and second connector parts are releasably joinable to each other to maintain the elongate operating arm in the operating state.

In one form, the first and second connector parts are fixed one each on the frame mounting portion and elongate operating arm and are joinable to each other without requiring any separate fastening elements.

In one form, the first connector is in the form of a clip that can be pivoted from a first position to a second position to thereby releasably join the first connector with the second connector.

In one form, the second position is an overcenter position.

In one form, with the first and second connectors joined, the elongate operating arm is drawn biasingly against the frame mounting portion.

In one form, the at least one supporting edge is defined by a formed wire.

The distance measuring device may further include a U-shaped stand having a base and first and second legs. The first and second legs may be attached to the frame mounting portion so that the wheel extends between the first and second legs and the base defines a supporting portion outside of the wheel radius.

In one form, the supporting portion is formed into a U shape so as to define two discrete support surfaces. The two discrete support surfaces, in conjunction with the elongate operating arm in the stored state, are bearable upon a flat, horizontal, underlying support surface to maintain the distance measuring device in an upright orientation wherein the first axis is horizontally oriented.

In one form, with the elongate operating arm in the stored state, the first axis extends through the elongate operating arm.

In one form, the wheel has a hub, a rim and a plurality of spokes extending between the hub and the rim.

In one form, with the distance measuring device viewed along the first axis, the distance measuring device resides within a squared frame having four orthogonal sides bounding an area, and the area of the squared frame is greater with the elongate operating arm in the operating state than with the elongate operating arm in the stored state.

In one form, the U-shaped stand, in conjunction with the wheel, are engageable with a flat, horizontal, support surface to cooperatively maintain the distance measuring device in an upright orientation where the first axis is horizontally oriented.

In one form, the elongate operating arm is pivotable about a second axis between the operating and stored states. The clip is pivotable about a third axis. The second and third axes are substantially parallel to each other.

In one form, the first axis is on one side of a plane orthogonal to the first axis and bisecting the wheel, and the second axis in on the other side of the plane.

BRIEF DESCRIPTION OF THE DRAWINGS

FIG. 4 is a front, top and side perspective view of the distance measuring device in FIGS. 1–3, from the side opposite that in FIG. 2;

FIG. 5 is a rear, top and side perspective view of the distance measuring device in FIGS. 1–4, from the same side as in FIG. 4;

DETAILED DESCRIPTION OF THE DRAWINGS

Figure 1:
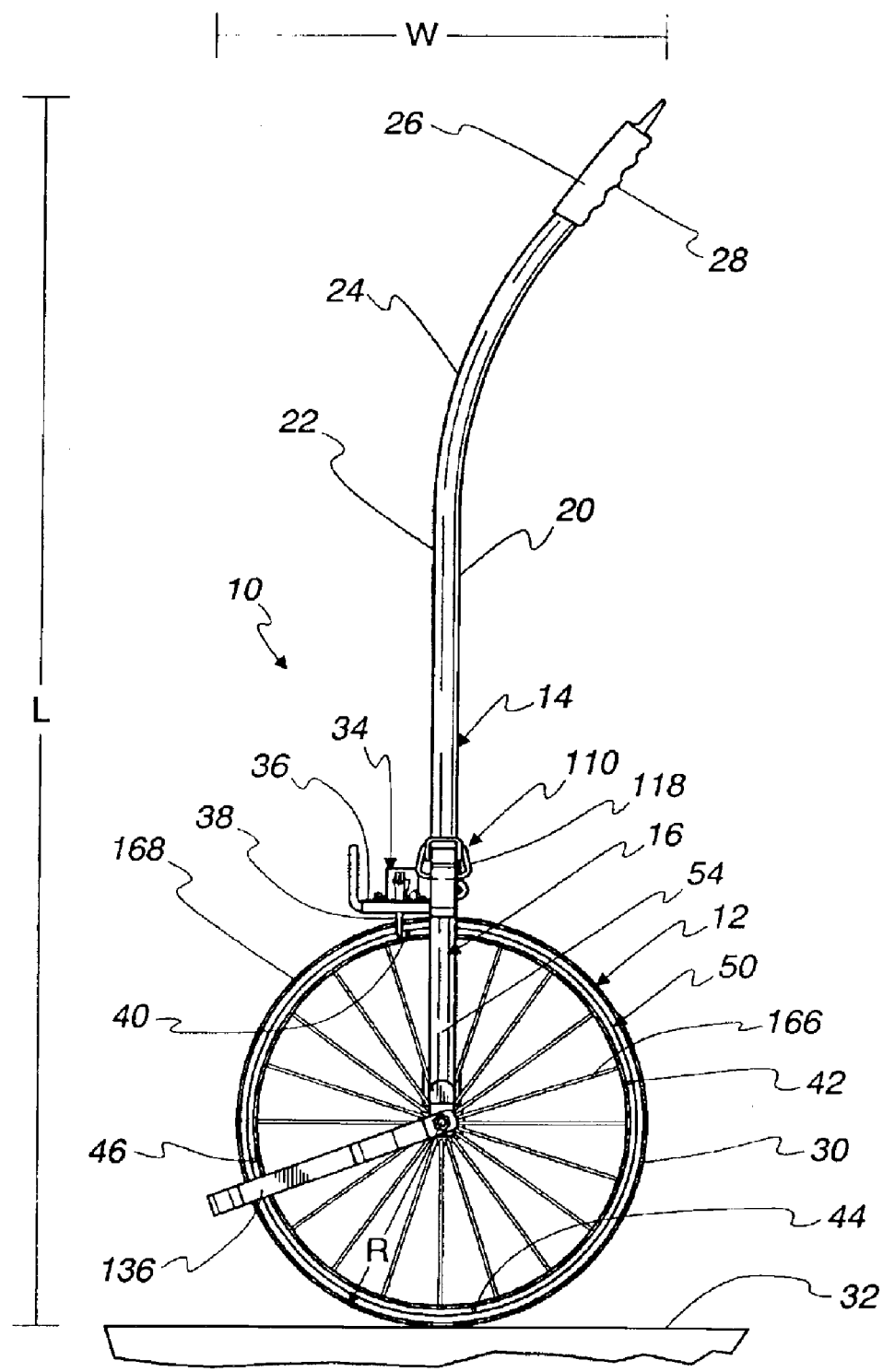
FIG. 1 is a side elevation view of a distance measuring device, according to the present invention.
Figure 2:
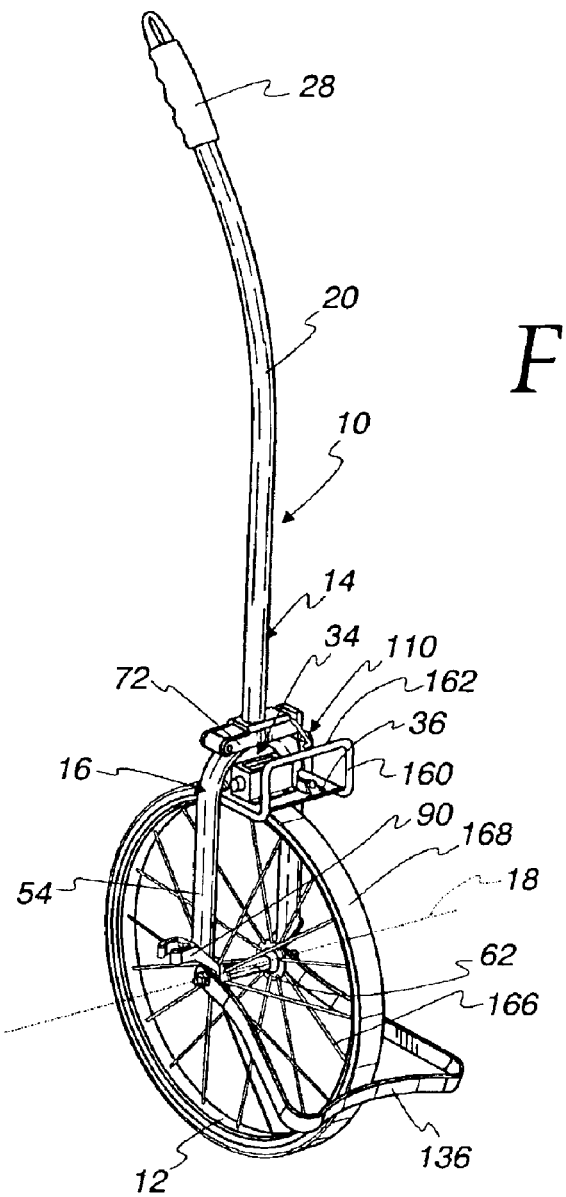
FIG. 2 is a front, top and side perspective view of the distance measuring device of FIG. 1.

Referring initially to FIGS. 1–5, a distance measuring device, according to the present invention, is shown at 10. The distance measuring device 10 consists of a wheel 12 and a frame 14. The frame 14 has a mounting portion 16 to which the wheel 12 is mounted for rotation around an axis 18. The frame 14 further has an elongate operating arm 20 which is connected to the mounting portion 16 of the frame 14 so as to project away from the wheel 12. The elongate operating arm 20 has a straight portion 22 projecting away from the mounting portion 16 and blending into a curved portion 24 which terminates at a free end 26 that is surrounded by a cushioned grip 28. The curved portion 24 allows the operator to grasp the grip 28 with the grasping hand situated in an ergonomically comfortable orientation.

By grasping the grip 28, the user can advance the wheel 12 along a path to be measured and, in so doing, the outer surface 30 of the wheel 12 rolls against an underlying surface 32. Measurements are depicted on a conventional counter 34 which is mounted upon a platform 36 on the frame mounting portion 16. The counter 34 has a trip arm 38 which is pivoted against a bias force each time the trip arm encounters any one of four trigger pins 40,42,44,46 projecting from one side wall 50 of the wheel 12. The trip arm 38 resides in the path of trigger pins 40–46 as the wheel 12 is rotated. Each trigger pin 40–46 moves the trip arm 38 against a bias force from a resting position/state into an actuating position and, upon clearing the trip arm 38, allows the trip arm 38 to move back to the resting position/state. Movement of the trip arm 38 from the resting position to the actuated position causes the counter 34 to register an increment of distance. The counter 34 is calibrated, taking into account the diameter of the wheel 12 and the number of trigger pins 40–46 to display a measured distance corresponding to that traversed by the wheel 12. The counter mechanism may be any of those well known to those skilled in the art and thus no detailed description of its operation herein is necessary.

Figure 3:
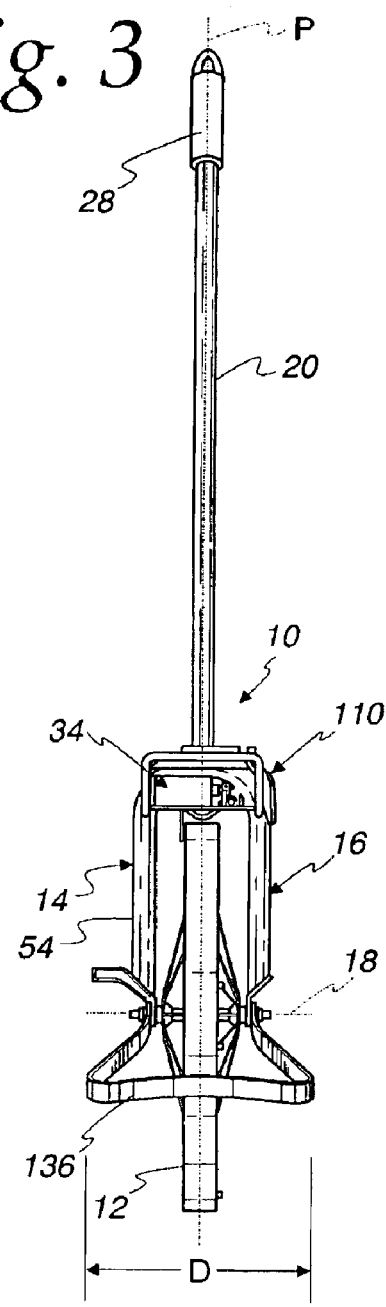
FIG. 3 is a front elevational view of the distance measuring device in FIGS. 1 and 2.

As seen in FIGS. 1 and 3, viewing the distance measuring device 10 along the axis 18, storage of the distance measuring device 10 in a squared container requires a container with length (L), width (W) and depth (D) dimensions as shown. As an example, the length L may be on the order of four feet, however, it could be substantially more or less. In any event, as a result of the design, a substantial volume of the container in the region wherein the elongate operating arm 12 resides is empty. According to the invention, the distance measuring device 10 is made to be reconfigurable so as to primarily reduce the dimension L, and thereby the size of the squared container required to enclose the distance measuring device 10.

Figure 6:
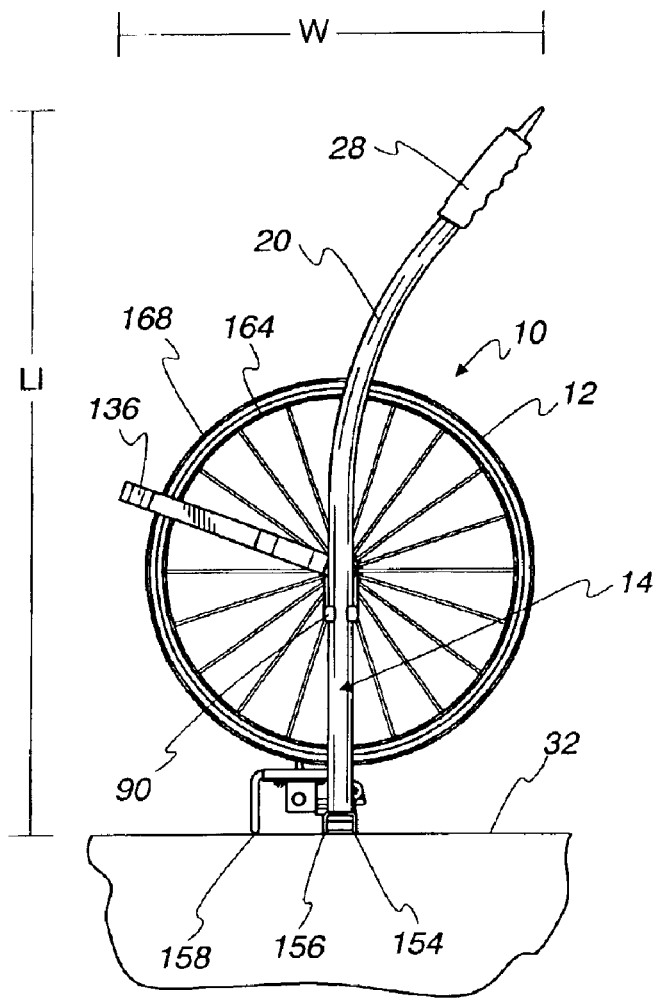
FIG. 6 is a side elevation view of the distance measuring device in FIGS. 1–5, with an operating arm thereon in a stored state, and maintained on a first upright orientation on a flat horizontal support surface.
Figure 7:
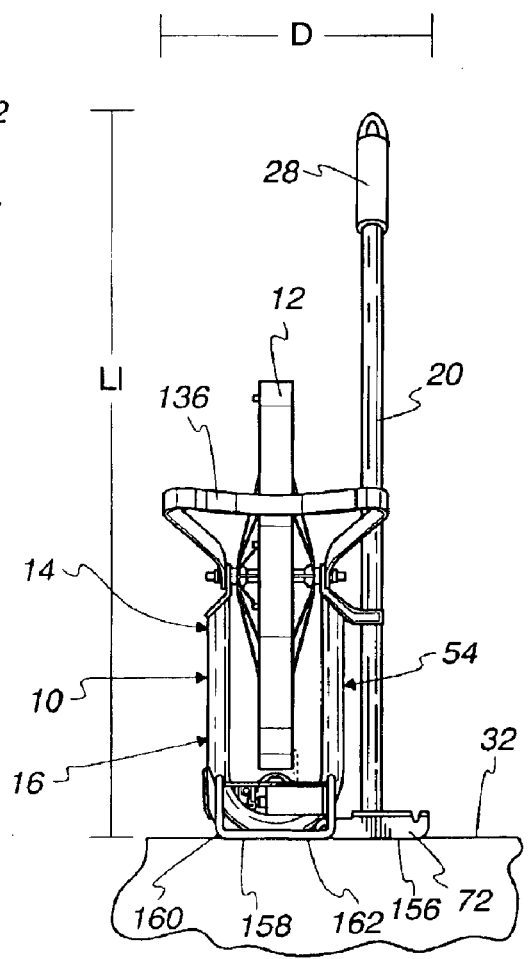
FIG. 7 is a front elevation view of the distance measuring device in the FIG. 6 state.

More specifically, to accomplish this compaction, the operating arm 20 is made pivotable relative to the mounting portion 16 between an operating state, shown in FIGS. 1–5, and a stored state, as shown in FIGS. 6–9. As seen in FIGS. 6 and 7, viewing the distance measuring device 10 from the same perspective as in FIG. 1, the width dimension (W) and depth dimension (D) remain the same while the length dimension L1 is reduced substantially from the distance L in FIG. 1.

Figure 11:
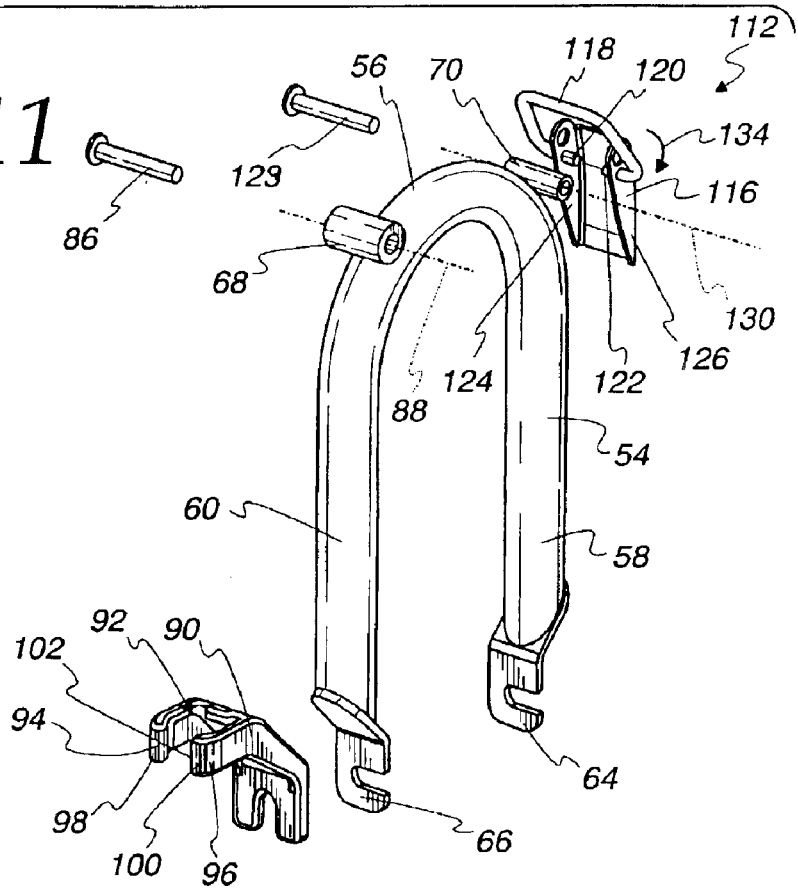
FIG. 11 is an enlarged, exploded, perspective view of a fork on the frame for the distance measuring device to which the wheel is attached for rotation.

The operating arm 20 is pivotably connected to a U-shaped fork 54, as seen most clearly in FIG. 11, having a base/bight portion 56 from which legs 58,60 project. An axle 62 on the wheel 12 is supported for rotation at the free ends 64,66 of the fork legs 58,60, respectively. First and second hinge bushings 68,70 are provided at the base/bight portion 56 of the fork 54 and are located on opposite sides of a reference plane P (FIG. 3) bisecting the operating arm 20, the fork 54, and the wheel 12 supported by the fork 54.

Figure 12:
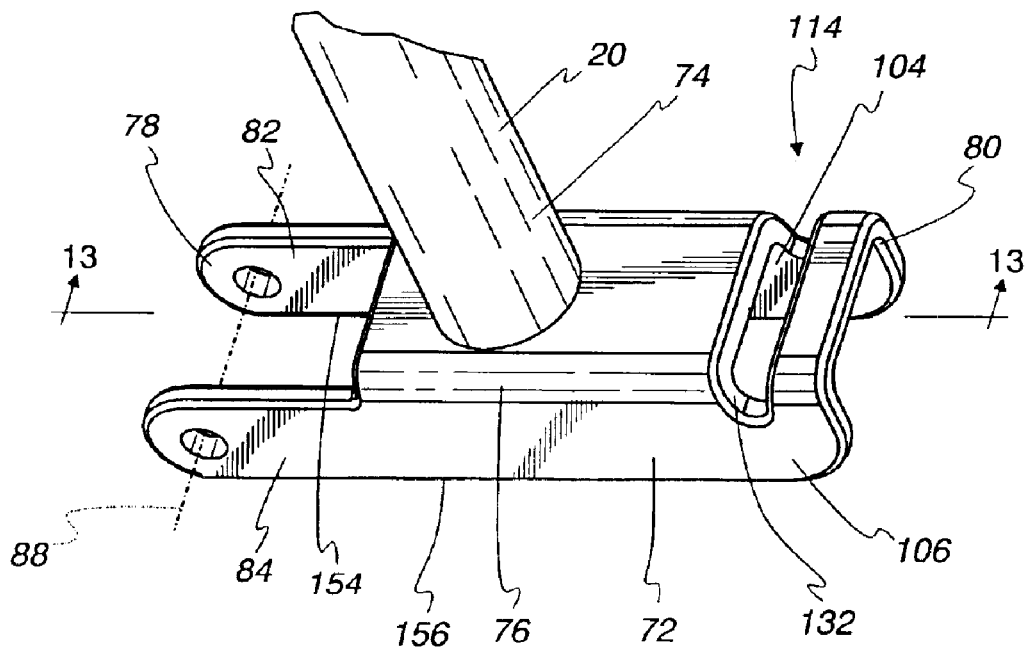
FIG. 12 is an enlarged, fragmentary, perspective view of a hinged bracket on the end of an operating arm which establishes a pivot connection for the operating arm to allow the operating arm to change between operating and stored states.
Figure 13:
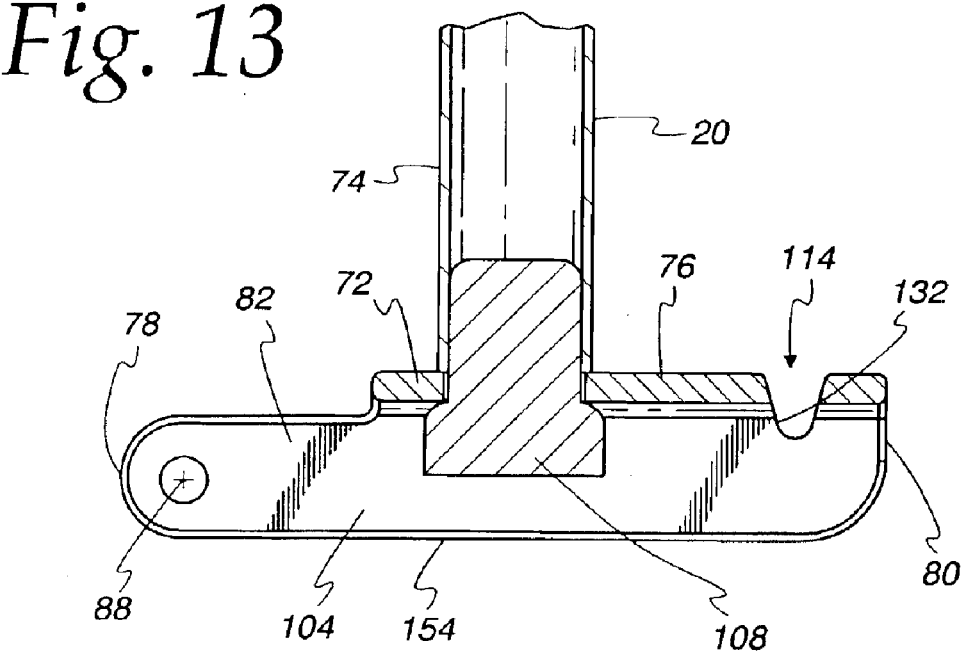
FIG. 13 is a cross-sectional view of the hinge bracket taken along line 13–13 of FIG. 12.

As seen most clearly in FIGS. 12 and 13, the operating arm 20 has a hinge bracket 72 at the end 74 remote from the end 26 upon which the cushioned grip 28 is attached. The hinge bracket 72 has a U-shaped body 76 with spaced ends 78,80 midway between which the operating arm 20 is attached. The end 78 is bifurcated, thereby defining spaced legs 82,84 which straddle the first hinge bushing 68. A pin 86 extending through the legs 82,84 and hinge bushing 68 guides pivoting movement of the hinge bracket 72 around the axis 88 defined by the pin 86. The hinge bracket 72 has a range of pivoting which allows the operating arm 20 to move between the operating position in FIGS. 1–5 and the stored position of FIGS. 6–9.

In the stored position, the operating arm 20 is pivoted into vertically overlapping relationship with the wheel 12, with the wheel axis 18 extending through the operating arm 20. A holding assembly 90 is attached to the free end 66 of the fork 54 and has a U-shaped receptacle 92 to accept the operating arm 20. The receptacle 92 is bounded by spaced legs 94,96 which have ends 98,100, respectively, defining a restricted opening 102 therebetween. The legs 94,96 are sufficiently resilient that they can be deformed to allow passage of the operating arm 20 therebetween into the receptacle 92. By pivoting the operating arm 20 from its operating state, the operating arm can be moved towards the stored state forcibly against the legs 94,96. This action cams the legs 94,96 apart. Continued movement of the operating arm 20 towards the stored state seats the operating arm 20 in the receptacle 92 and allows the legs 94,96 to flex back to their undeformed state, in so doing releasably maintaining the operating arm 20 within the receptacle 92.

The operating arm 20 can be moved out of its stored state by applying a significant opposite pivoting force thereupon. As this occurs, the legs 94,96 wedge towards a spread state which allows release of the operating arm 20 from the receptacle 92. Continued pivoting of the operating arm 20 causes the operating arm 20 to ultimately realize the operating state, wherein spaced walls 104,106 on the hinge bracket 72 straddle the base/bight portion 56 of the fork 54. A resilient bung 108 bears upon the base/bight portion 56 of the fork 54 with the operating arm 20 in the operating state. The operating arm is maintained in the operating state by a connection at 110 consisting of a first connector 112 on the fork 54, and a second connector 114 on the hinge bracket 72. The first connector 112 is in the form of a clip with a U-shaped body 116 and having a wire formed loop 118 pivotably attached to the body 116. The loop 118 has free ends 120,122 which project through spaced walls 124,126 on the body 116 from opposite directions towards each other. The body 116 and loop 118 are pivotably connected to the fork 54 by a pin 129, which extends through the hinge bushing 70 and walls 124,126 and defines a pivot axis 130.

The second connector 114 consists of a U-shaped receptacle 132 spanning the full dimension of the hinge bracket 72. With the operating arm 20 in the operating state, the clip body 116 is pivoted to allow the loop 118 to be placed immediately over the receptacle 132. By then pivoting the clip body 116 in the direction of arrow 134 (FIG. 11) around the axis 130, the clip body 116, through the loop 118, draws the end 80 of the hinge bracket 72 forcibly against the bung 108. The clip body 116 eventually achieves an overcenter position and thereby releasably maintains itself in a holding state. The connection can be released by pivoting the clip body 116 oppositely to the arrow 134 in FIG. 11, and separating the loop 118 from the hinge bracket 72.

Figure 9:
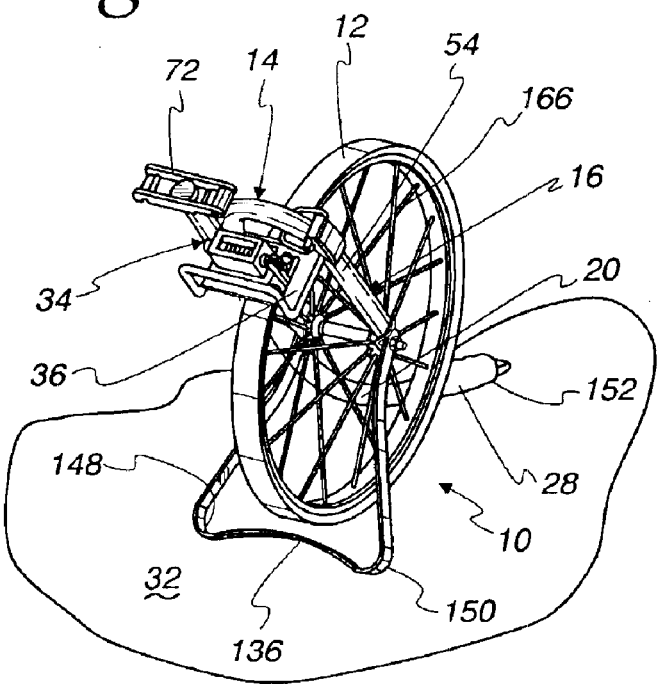
FIG. 9 is a front, top and side perspective view of the distance measuring device in the stored state of FIGS. 6–8 and supported upon an underlying surface in a second upright orientation.
Figure 10:
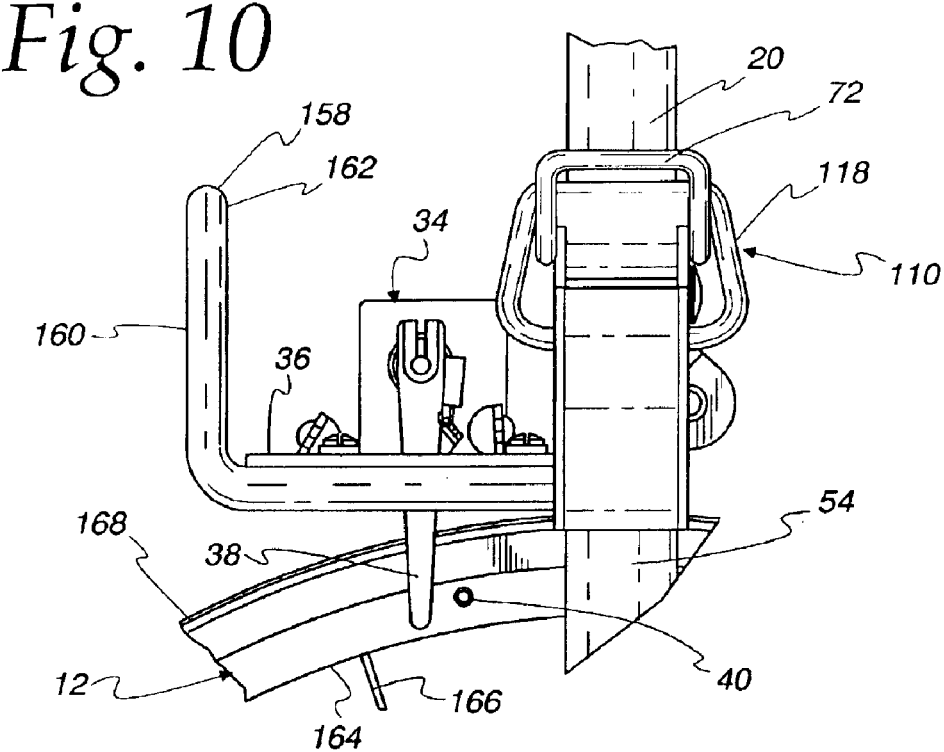
FIG. 10 is an enlarged, fragmentary, side elevation view of a portion of the distance measuring device of FIGS. 1–9 showing a counter which converts rotation of a wheel on the distance measuring device into a distance reading.

In the above-described structure, the distance measuring device 10 can be maintained, by the cooperation of several different structures, in different upright orientations wherein the wheel axis 18 is horizontally oriented with respect to a flat, horizontally situated surface upon which the distance measuring device 10 bears. The U-shaped stand 136, which is conventional in construction, has spaced legs 138,140 projecting from a base 142 and straddling the wheel 12. The ends 144,146 of the legs 138,140 are mounted one each to the ends of the wheel axle 62. The legs 138,140 have a length sufficiently greater than the radius R of the wheel 12 that the base 142 is spaced radially outwardly from the outer surface 30 of the wheel 12. The base 142 has a U shape so as to define spaced portions 148,150 which can be borne against the underlying surface 32. As seen in FIG. 5, the bottom of the wheel 12 and the bottom of the portions 148,150 make a three point contact with the surface 32 to balance the distance measuring device 10 in a first upright orientation with the operating arm 20 in its operating state. As seen in FIG. 9, with the operating arm 20 in its stored state, the measuring device 10 can be maintained in a second upright orientation with a three point contact established by the portions 148,150 of the stand 136 and the surface 152 on the grip 28.

Figure 8:
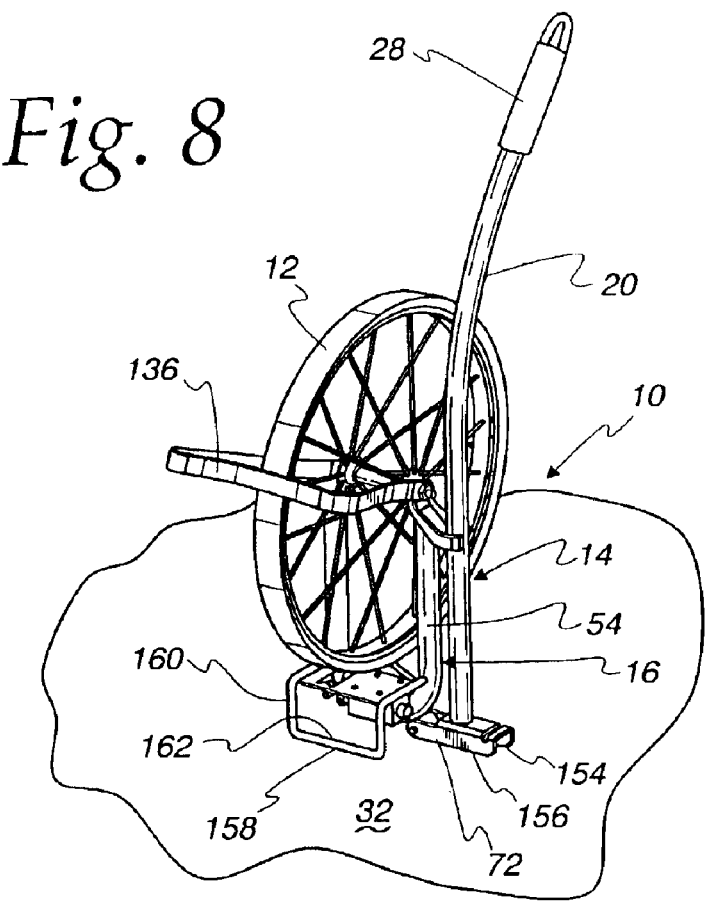
FIG. 8 is a front and side perspective view of the distance measuring device in the state of FIGS. 6 and 7.

The distance measuring device 10 can be maintained upright in a still further upright orientation as shown in FIGS. 6–8, with the operating arm 20 in the stored state. The measuring device 10 is supported cooperatively by elongate edges 154,156 on the hinge bracket 72 and an edge 158 on a formed wire element 160 and projecting upwardly from the platform 36. The wire element 160 has a horizontally extending portion 162 defining the edge 158. The wire element 160, in addition to providing a support, shields the counter 34 from unwanted contact from above and the sides.

Aside from permitting the distance measuring device 10 to be maintained in an upright orientation, the various supporting parts also establish a sizable contact area with a container wall within which the distance measuring device 10 may be placed, so as to avoid localized stress concentration upon the container.

In the embodiment shown, the wheel 12 is made with a rim 164 and a plurality of spokes 166 extending between the rim 164 and the axle 62. A rubber tire 168 surrounds the rim 164 and is made of a material that has good wear resistance but which will grip upon a surface on which a measurement is being taken.

While the invention has been described with particular reference to the drawings, it should be understood that various modifications could be made without departing from the spirit and scope of the present invention.

What is claimed is:

1. A distance measuring device comprising:

a wheel having a radius on an exposed surface that can be rolled against a surface upon which a distance measurement is to be taken;

a frame upon which the wheel is mounted for rotation around a first axis, the frame comprising a U-shaped fork to which the wheel is mounted; and a distance counter on the frame that is actuated by the wheel, the frame comprising an elongate operating arm projecting away from the wheel, the frame comprising a mounting portion including the U-shaped fork to which the wheel is mounted for rotation, the elongate operating arm having a graspable free end and an opposite end spaced from the free end and pivotable relative to the mounting portion between an operating state and a stored state, wherein the elongate operating arm is mounted at the U-shaped fork for pivoting movement about a second axis between the operating and stored states and the first and second axes are non-parallel to each other.

2. The distance measuring device according to claim 1 wherein the first and second axes are substantially orthogonal to each other.

3. The distance measuring device according to claim 1 further comprising a resilient holding element on the frame, the resilient holding element engaging the elongate operating arm to releasably maintain the elongate operating arm in the stored state.

4. The distance measuring device according to claim 3 wherein the resilient holding element comprises at least one arm that is changeable between first and second states, the at least one arm changing from the first state into the second state and back into the first state as an incident of the elongate operating arm changing from the operating state into the stored state.

5. The distance measuring device according to claim 1 wherein there is a first connector part on the frame mounting portion and a second connector part on the elongate operating arm, the first and second connector parts joinable to each other to releasably maintain the elongate operating arm in the operating state.

6. The distance measuring device according to claim 5 wherein the first and second connector parts are fixed one each on the frame mounting portion and elongate operating arm and are joinable to each other without requiring any separate fastening elements.

7. The distance measuring device according to claim 5 wherein the first connector part comprises a clip that can be pivoted from a first position into a second position to thereby releasably join the first connector part with the second connector part.

8. The distance measuring device according to claim 7 wherein the second position of the first connector part is an overcenter position.

9. The distance measuring device according to claim 7 wherein the elongate operating arm is pivotable about a second axis between the operating and stored states, the clip is pivotable about a third axis, and the second and third axes are substantially parallel to each other.

10. The distance measuring device according to claim 9 wherein the second axis is on one side of a plane orthogonal to the first axis and bisecting the wheel, and the third axis is on the other side of the plane.

11. The distance measuring device according to claim 5 further comprising a resilient element, wherein with the first and second connector parts joined, the elongate operating arm is drawn biasably toward the frame mounting portion with the resilient element compressed captively between the elongate operating arm and the frame mounting portion.

12. The distance measuring device according to claim 1 further comprising a U-shaped stand having a base and spaced first and second legs, the first and second legs attached to the frame mounting portion so that the wheel extends between the first and second legs and the base defines a supporting portion outside of the wheel radius.

13. The distance measuring device according to claim 12 wherein the U-shaped stand, in conjunction with the wheel, are engageable with a flat, horizontal, support surface to cooperatively maintain the distance measuring device in an upright orientation where the first axis is horizontally oriented.

14. The distance measuring device according to claim 1 wherein with the elongate operating arm in the stored state, the first axis extends through the elongate operating arm.

15. The distance measuring device according to claim 1 wherein the wheel comprises a hub, a rim, and a plurality of spokes extending between the hub and the rim.

16. The distance measuring device according to claim 1 wherein the distance measuring device, as viewed along the first axis, resides within a squared frame having four orthogonal sides bounding an area and the area of the squared frame is greater with the elongate operating arm in the operating state than with the elongate operating arm in the stored state.

17. The distance measuring device according to claim 1 wherein the U-shaped fork has a vertical extent and opens downwardly with the distance measuring device being operated and the second axis resides within the vertical extent of the U-shaped fork.

18. A distance measuring device comprising:
a wheel having a radius on an exposed surface that can be rolled against a surface upon which a distance measurement is to be taken;
a frame upon which the wheel is mounted for rotation around a first axis; and
a distance counter on the frame that is actuated by the wheel,
the frame comprising an elongate operating arm projecting away from the wheel,
the frame comprising a mounting portion to which the wheel is mounted for rotation,
the elongate operating arm pivotable relative to the mounting portion between an operating state and a stored state,
wherein the elongate operating arm has a hinge bracket which is pivotably connected to the frame mounting portion and the hinge bracket has a first edge which can be placed supportingly against a flat, horizontal, underlying surface with the elongate operating arm in the stored state to maintain the distance measuring device in an upright orientation wherein the first axis is horizontally oriented.

19. The distance measuring device according to claim 18 wherein the hinge bracket has a second edge spaced from the first edge which can be placed supportingly against a flat, horizontal, underlying surface simultaneously with the first edge to maintain the distance measuring device in the upright orientation with the elongate operating arm in the stored state.

20. The distance measuring device according to claim 18 further comprising at least one supporting edge on the frame mounting portion which can be placed supportingly against a flat, horizontal, underlying surface simultaneously with the first edge with the elongate operating arm in the stored state to maintain the distance measuring device in the upright orientation.

21. The distance measuring device according to claim 20 wherein the at least one supporting edge is defined by a formed wire.

22. A distance measuring device comprising:
a wheel having a radius on an exposed surface that can be rolled against a surface upon which a distance measurement is to be taken;
a frame upon which the wheel is mounted for rotation around a first axis,
the frame comprising a U-shaped fork to which the wheel is mounted; and
a distance counter on the frame that is actuated by the wheel, the frame comprising an elongate operating arm projecting away from the wheel, the frame comprising a mounting portion including the U-shaped fork to which the wheel is mounted for rotation, the elongate operating arm having a graspable free end and an opposite end spaced from the free end and pivotable relative to the mounting portion between an operating state and a stored state, wherein the elongate operating arm is mounted to the U-shaped fork for movement about a second axis between the operating and stored states and the first and second axes are non-parallel to each other, the distance measuring device further comprising a U-shaped stand having a base and spaced first and second legs, the first and second legs attached to the frame mounting portion so that the wheel extends between the first and second legs and the base defines a supporting portion outside of the wheel radius, wherein the supporting portion is formed in a U shape so as to define two discrete support surfaces, the two discrete support surfaces in conjunction with the elongate operating arm in the stored state bearable upon a flat, horizontal, upwardly facing, underlying support surface to maintain the distance measuring device in an upright orientation wherein the first axis is horizontally oriented.

23. A distance measuring device comprising:

a wheel having a radius on an exposed surface that can be rolled against a surface upon which a distance measurement is to be taken;

a frame upon which the wheel is mounted for rotation around a first axis and including a U-shaped fork; and a distance counter on the frame that is actuated by the wheel, the frame comprising an elongate operating arm projecting away from the wheel, the frame comprising a mounting portion to which the wheel is mounted for rotation, the elongate operating arm pivotable relative to the mounting portion between an operating state and a stored state, the distance measuring device having an edge which can be placed supportingly against a flat, horizontal, upwardly facing, underlying surface with the U-shaped fork opening upwardly and the elongate operating arm in the stored state to maintain the distance measuring device in an upright orientation wherein the first axis is horizontally oriented and the operating arm projects upwardly away from the underlying surface.

24. A distance measuring device comprising:

a wheel having a radius on an exposed surface that can be rolled against a surface upon which a distance measurement is to be taken;

a frame upon which the wheel is mounted for rotation around a first axis; and a distance counter on the frame that is actuated by the wheel, the frame comprising an elongate operating arm projecting away from the wheel, the frame comprising a mounting portion to which the wheel is mounted for rotation, the elongate operating arm pivotable relative to the mounting portion between an operating state and a stored state and about a second axis that is non-parallel to the first axis, the distance measuring device further comprising a resilient holding element on the frame, the resilient holding element engaging the elongate operating arm to releasably maintain the elongate operating arm in the stored state, wherein the resilient holding element comprises at least one arm that is changeable between first and second states, the at least one arm changing from the first state into the second state and back into the first state as an incident of the elongate operating arm changing from the operating state into the stored state.

* * * * *